United States Patent
Thise et al.

(10) Patent No.: US 6,465,670 B2
(45) Date of Patent: Oct. 15, 2002

(54) PREPARATION OF SURFACE MODIFIED SILICA

(75) Inventors: Ghislain Adolphe Leon Thise, Bastogne (BE); Giorgio Agostini, Colmar-Berg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/902,118

(22) Filed: Jul. 10, 2001

(65) Prior Publication Data

US 2002/0022085 A1 Feb. 21, 2002

Related U.S. Application Data

(60) Provisional application No. 60/222,430, filed on Aug. 1, 2000.

(51) Int. Cl.$^7$ .................................................. C07F 7/08
(52) U.S. Cl. ...................................... 556/400; 556/427
(58) Field of Search ............................... 556/400, 427

(56) References Cited

U.S. PATENT DOCUMENTS

| | | | |
|---|---|---|---|
| 3,024,126 A | 3/1962 | Brown | 106/308 |
| 4,985,477 A | 1/1991 | Collins et al. | 523/212 |
| 5,077,422 A | 12/1991 | Colas et al. | 556/438 |
| 5,403,570 A | 4/1995 | Chevallier | 423/339 |
| 5,404,985 A | 4/1995 | Parker et al. | 556/427 |
| 5,468,893 A | 11/1995 | Parker et al. | 556/427 |
| 5,583,245 A | 12/1996 | Parker et al. | 556/427 |
| 5,663,396 A | 9/1997 | Musleve et al. | 556/427 |
| 5,674,932 A | 10/1997 | Agostini et al. | 524/430 |
| 6,068,694 A | 5/2000 | Bernard et al. | 106/490 |
| 6,235,258 B1 * | 5/2001 | Muller et al. | 556/400 |
| 6,384,256 B1 * | 5/2002 | Backer | 556/427 |

FOREIGN PATENT DOCUMENTS

WO  9853004  11/1998  ............ C08K/9/06

OTHER PUBLICATIONS

European Search Report.

* cited by examiner

Primary Examiner—Paul F. Shaver
(74) Attorney, Agent, or Firm—Bruce J. Hendericks

(57) ABSTRACT

A process for the modification of the surface of a silica with a silane compound comprising mixing an aqueous suspension of precipitated silica particulates with a silane compound which is dissolved in an organic solvent, in the presence of a phase transfer catalyst.

20 Claims, No Drawings

PREPARATION OF SURFACE MODIFIED SILICA

The Applicants hereby incorporate by reference prior U.S. Provisional Application Ser. No. 60/222,430, filed on Aug. 1, 2000.

BACKGROUND OF THE INVENTION

Sulfur containing organosilicon compounds are useful as reactive coupling agents between rubber and silica fillers providing for improved physical properties. They are also useful as adhesion primers for glass, metals and other substrates.

Conventionally, organosilicon coupling agents are dispersed on the surface of fillers for use in rubber. The most common filler is carbon black. Dispensing organosilicon coupling agent on the surface of precipitated silica is also known. Generally, this process is achieved either during the mixing of the silica, rubber and coupling agent or a process where the silica powder and the coupling agent are blended together prior to addition of the rubber compound. Unfortunately, such methods result in unequal distribution of silane on the surface of the silica and lack of uniformity in properties when used in rubber.

SUMMARY OF THE INVENTION

The present invention relates to a process for the modification of the surface of a silica with a silane compound comprising mixing an aqueous suspension of precipitated silica particulates with a silane compound which is dissolved in an organic solvent, in the presence of a phase transfer catalyst. The present invention also relates to the product of its claimed process.

DETAILED DESCRIPTION OF THE INVENTION

The process of the present invention is conducted during the synthesis of the precipitated silicate. Process steps prior to the addition of the addition of the phase transfer catalyst and silane is well known to those skilled in the art. For example, the acidifying agent and silicate are well known. Representative examples of acidifying agents are inorganic acids such as sulfuric, nitric, phosphoric and hydrochloric and the organic acids such as acetic, formic and carbonic acids.

The silicate may be any common form, such as the metasilicates, disilicates, and advantageously, an alkali metal silicate particularly sodium or potassium silicate. When sodium silicate is used, it typically has an $SiO_2/Na_2O$ weight ratio of from 2 to 4:1, and more particularly, from 3.0 to 3.7:1.

The silicate and electrolyte are combined. The amount of silicate present may be either the total amount required for the reaction or only a portion of that amount.

As regards the "electrolyte", this term is used in its normal sense, i.e., any ionic or molecular species which decomposes or dissociates when in solution, to form ions or charged particles. Salts selected from among the alkali metal and alkaline earth metal salts are particularly exemplary electrolytes, preferably the salt of the starting material silicate and the acidifying agent, for example sodium sulfate in the case of a reaction between a sodium silicate and sulfuric acid. The concentration of electrolyte in the step may vary but is generally less than 17 g/l. Preferably, the concentration of electrolytes is less than 14 g/l.

The concentration of silicate in the step is generally less than 100 g $SiO_2$ per liter. This concentration is preferably less than 80 g/l and more preferably less than 70 g/l. When high concentrations of the acid is used for the neutralization, i.e. over 70 percent, it is preferred to conduct the reaction using an initial silicate sediment in which the concentration of $SiO_2$ is less than 80 g/l.

The next step in the precipitation involves introducing an acidifying agent into the reaction having the composition described above. The addition of this agent, which results in a correlated lowering of the pH of the reaction medium, is continued until a pH of at least about 7, generally from 7 to 8, is attained. Once this value is attained and in the event of a reaction comprising only a portion of the total amount of silicate required, it is advantageous to introduce the additional acidifying agent and the remainder of the silicate simultaneously. The precipitation reaction proper is complete when all of the remaining silicate has been added.

The reaction medium is allowed to age or mature after the precipitation is complete. The aging step may vary, but is generally from 5 minutes to 1 hour.

Nonetheless, in all instances (namely, whether the reaction contains the total amount of silicate required or only a portion thereof), an additional amount of acidifying agent may be added to the reaction medium after precipitation, optionally in a later stage. The acid agent is generally added until a pH of from 3 to 6.5, and preferably from 4 to 6.5, is attained.

The temperature of the reaction medium typically ranges from 70° C. to 98° C. The reaction may be carried out at a constant temperature ranging from 80° C. to 95° C.

The temperature at the end of the reaction may be higher than at the beginning. Thus the temperature at the beginning of the reaction may be maintained at from 70° C. to 95° C.; it is then increased over a few minutes, preferably to 80° C. to 98° C. and maintained at that level to the end of the reaction.

It is at this stage, the silane, organic solvent and phase transfer catalyst are introduced to the reaction.

Representative examples of suitable silanes are of the formula:

$$Z\text{-Alk-}S_n\text{-Alk-}Z \quad \quad (I)$$

in which Z is selected from the group consisting of

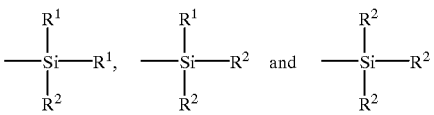

where $R^1$ is an alkyl group of 1 to 4 carbon atoms, cyclohexyl or phenyl; $R^1$ is alkoxy of 1 to 8 carbon atoms, or cycloalkoxy of 5 to 8 carbon atoms; Alk is a divalent aliphatic and/or aliphatic-aromatic hydrocarbon of 1 to 18 carbon atoms and n is an integer of 2 to 8.

Examples of sulfur containing organosilicon compounds of formula 1 which may be used to modify the silica surface include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis (triethoxysilylpropyl) trisulfide, 3,3'-bis (tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis (dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di-t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18 '-bis (trimethoxysilyloctadecyl) tetrasulfide, 18,18 '-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide and 3,3 '-bis (dimethoxyphenylsilyl-2-methylpropyl) disulfide.

The preferred sulfur containing organosilicon compounds which are prepared in accordance with the present invention are the 3,3'-bis(trimethoxy or triethoxy silylpropyl) polysulfides. The most preferred compound is 3,3'-bis (triethoxysilylpropyl) disulfide. Therefore as to formula I, preferably Z is

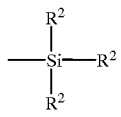

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 2 to 6 with 2 being particularly preferred.

Additional silanes which may be used include unsymmetrical organosilicon compounds are of the formula Alk-S$_n$-Alk-Z  (II)

where n, Alk and Z are as previously defined. As can be appreciated, Alk is a divalent hydrocarbon of 1 to 18 carbon atoms; and, therefore, to avoid duplication, the representative list of unsymmetrical compounds incorporate "alkyl" in their name whereas one skilled in the art appreciates it would be methyl, ethyl, propyl, butyl, etc, and up to octyldecyl, depending on the reactants used. Such representative unsymmetrical compounds include: 3-(trimethoxysilylpropyl) n-alkyl disulfide, 3-(triethoxysilylpropyl) n-alkyl tetrasulfide, 3-(triethoxysilylpropyl) n-alkyl octasulfide, 3-(trimethoxysilylpropyl) n-alkyl tetrasulfide, 2-(triethoxysilylethyl) n-alkyl tetrasulfide, 3-(trimethoxysilylpropyl) n-alkyl trisulfide, 3-(triethoxysilylpropyl) n-alkyl trisulfide, 3-(tributoxysilylpropyl) n-alkyl disulfide, 3-(trimethoxysilylpropyl) n-alkyl hexasulfide, 3-(trimethoxysilylpropyl) n-alkyl octasulfide, 3-(trioctoxysilylpropyl) n-alkyl tetrasulfide, 3-(trihexoxysilylpropyl) n-alkyl disulfide, 3-(triisooctoxysilylpropyl) n-alkyl tetrasulfide, 3-(tri-t-butoxysilylpropyl) n-alkyl disulfide, 2-(methoxy diethoxy silyl ethyl) n-alkyl tetrasulfide, 2-(tripropoxysilylethyl) n-alkyl pentasulfide, 3-(tricyclonexoxysilylpropyl) n-alkyl tetrasulfide, 3-(tricyclopentoxysilylpropyl) n-alkyl trisulfide, 2-(dimethyl methoxysilylethyl) n-alkyl disulfide, 2-(dimethyl sec.butoxysilylethyl) n-alkyl trisulfide, 3-(methyl butylethoxysilylpropyl) n-alkyl tetrasulfide, 3 -(di t-butylmethoxysilylpropyl) n-alkyl tetrasulfide, 2-(phenyl methyl methoxysilylethyl) n-alkyl trisulfide, 3-(diphenyl isopropoxysilylpropyl) n-alkyl tetrasulfide, 3-(diphenyl cyclohexoxysilylpropyl) n-alkyl disulfide, 3-(dimethyl ethylmercaptosilylpropyl) n-alkyl tetrasulfide, 2-(methyl dimethoxysilylethyl) n-alkyl trisulfide, 2-(methyl ethoxypropoxysilylethyl) n-alkyl tetrasulfide, 3-(diethyl methoxysilylpropyl) n-alkyl tetrasulfide, 3-(ethyl di-sec.butoxysilylpropyl) n-alkyl disulfide, 3-(propyl diethoxysilylpropyl) n-alkyl disulfide, 3-(butyl dimethoxysilylpropyl) n-alkyl trisulfide, 3-(phenyl dimethoxysilylpropyl) n-alkyl tetrasulfide, 4-(trimethoxysilylbutyl) n-alkyl tetrasulfide, 6-(triethoxysilylhexyl) n-alkyl tetrasulfide, 12-(triisopropoxysilyl dodecyl) n-alkyl disulfide, 18-(trimethoxysilyloctadecyl) n-alkyl tetrasulfide, 18-(tripropoxysilyloctadecenyl) n-alkyl tetrasulfide, 4-(trimethoxysilyl-buten-2-yl) n-alkyl tetrasulfide, 4-(trimethoxysilylcyclohexylene) n-alkyl tetrasulfide, 5-(dimethoxymethylsilylpentyl) n-alkyl trisulfide, 3-(trimethoxysilyl-2-methylpropyl) n-alkyl tetrasulfide and 3-(dimethoxyphenylsilyl-2-methylpropyl) n-alkyl disulfide.

Additional silane containing compounds which may be used in the present invention are of the formula

III

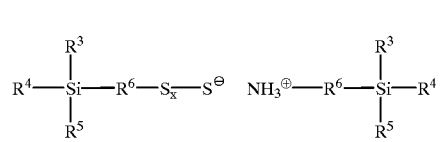

wherein each $R^3$ and $R^4$ are independently selected from the group consisting of alkoxy radicals having from 1 to 8 carbon atoms and alkyls having from 1 to 8 carbon atoms; $R^5$ is selected from the group consisting of alkoxy radicals having from 1 to 8 carbon atoms; each $R^6$ is independently selected from the group consisting of alkylenes and having from 1 to 15 carbon atoms, arylenes alkyl substituted arylenes having from 6 to 10 carbon atoms, —$R^7$—O—$R^8$— and —$R^7$—NH—$R^9$—; $R^7$ and $R^9$ are independently selected from the group consisting of alkylenes having from 1 to 15 carbon atoms, arylenes and alkyl substituted arylenes having from 6 to 10 carbon atoms; $R^8$ is selected from the group consisting of alkylenes having from 1 to 15 carbon atoms, arylenes and alkyl substituted arylenes having from 6 to 10 carbon atoms and alkenylenes having from 2 to 15 carbon atoms; and x is an integer of from 0 to 7. Preferably, $R^3$, $R^4$ and $R^5$ are each an alkoxy group having from 1 to 3 carbon atoms, each $R^6$ are alkylenes having 1 to 3 carbon atoms and x is 0.

Representative of the siloxy containing salt compounds of Formula III are ammonium ethyl triethoxysilane ethyl triethoxy silane sulfide, ammonium propyl triethoxysilane propyl triethoxy silane sulfide, ammonium ethyl trimethoxysilane ethyl trimethoxy silane sulfide, ammonium propyl trimethoxysilane propyl trimethoxy silane sulfide; ammonium ethyl triethoxysilane ethyl triethoxy silane disulfide, ammonium propyl triethoxysilane propyl triethoxy silane disulfide, ammonium ethyl trimethoxysilane ethyl trimethoxy silane disulfide, ammonium propyl trimethoxysilane propyl trimethoxy silane disulfide; ammonium ethyl triethoxysilane ethyl triethoxy silane trisulfide, ammonium propyl triethoxysilane propyl triethoxy silane trisulfide, ammonium ethyl trimethoxysilane ethyl trimethoxy silane trisulfide, ammonium propyl trimethoxysilane propyl trimethoxy silane trisulfide; ammonium ethyl triethoxysilane ethyl triethoxy silane tetrasulfide, ammonium propyl triethoxysilane propyl triethoxy silane tetrasulfide, ammonium ethyl trimethoxysilane ethyl trimethoxy silane tetrasulfide, ammonium propyl trimethoxysilane propyl trimethoxy silane tetrasulfide; ammonium ethyl triethoxysilane ethyl triethoxy silane pentasulfide, ammonium propyl triethoxysilane propyl triethoxy silane pentasulfide, ammonium ethyl trimethoxysilane ethyl trimethoxy silane pentasulfide, ammonium propyl trimethoxysilane propyl trimethoxy silane pentasulfide; ammonium ethyl triethoxysilane ethyl triethoxy silane hexasulfide, ammonium propyl triethoxysilane propyl triethoxy silane hexasulfide, ammonium ethyl trimethoxysilane ethyl trimethoxy silane hexasulfide, ammonium propyl trimethoxysilane propyl trimethoxy silane hexasulfide; ammonium ethyl triethoxysilane ethyl triethoxy silane heptasulfide, ammonium propyl triethoxysilane propyl triethoxy silane heptasulfide, ammonium ethyl trimethoxysilane ethyl trimethoxy silane heptasulfide, ammonium propyl trimethoxysilane propyl trimethoxy silane heptasulfide; ammonium ethyl triethoxysilane ethyl triethoxy silane octasulfide, ammonium propyl triethoxysilane propyl triethoxy silane octasulfide, ammonium ethyl trimethoxysilane ethyl trimethoxy silane octasulfide and ammonium propyl trimethoxysilane propyl trimethoxy silane octasulfide.

The siloxy containing salt compounds of formula III when x is 0 may be prepared by reacting a mercaptan compound of the formula:

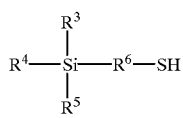

IV with an amino compound of the formula:

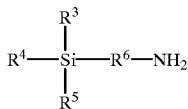

V wherein $R^3$, $R^4$, $R^5$ and $R^6$ are as described above.

The mercaptan compounds of formula IV and the amino compounds of formula V are commercially available. Representative examples of compounds of formula IV include 2-mercaptoethyl trimethoxysilane, 3-mercaptopropyl trimethoxysilane, 3-mercaptopropyl triethoxysilane, 2-mercaptopropyl triethoxysilane, 2-mercaptoethyl tripropoxysilane, 2-mercaptoethyl tri sec-butoxysilane, 3-mercaptopropyl tri-t-butoxysilane, 3-mercaptopropyl tri-isopropoxysilane; 3-mercaptopropyl trioctoxysilane, 2-mercaptoethyl tri-2'-ethylhexoxysilane, 2-mercaptoethyl dimethoxy ethoxysilane, 3-mercaptopropyl methoxyethoxypropoxysilane, 3-mercaptopropyl dimethoxy methylsilane, 3-mercaptopropyl methoxy dimethylsilane, 3-mercaptopropyl diethoxy methylsilane, 3-mercaptopropyl ethoxy dimethylslane, 3-mercaptopropyl cyclohexoxy dimethyl silane, 4-mercaptobutyl trimethoxysilane, 3-mercapto-3-methylpropyltrimethoxysilane, 3-mercapto-3-methylpropyltripropoxysilane, 3-mercapto-3-ethylpropyl-dimethoxy methylsilane, 3-mercapto-2-methylpropyl trimethoxysilane, 3-mercapto-2-methylpropyl dimethoxy phenylsilane, 3-mercaptocyclohexyl-trimethoxysilane, 12-mercaptododecyl trimethoxy silane, 12-mercaptododecyl triethoxy silane, 18-mercaptooctadecyl trimethoxysilane, 18-mercaptooctadecyl methoxydimethylsilane, 2-mercapto-2-methylethyl-tripropoxysilane, 2-mercapto-2-methylethyl-trioctoxysilane, 2-mercaptophenyl trimethoxysilane, 2-mercaptophenyl triethoxysilane; 2-mercaptotolyl trimethoxysilane; 2-mercaptotolyl triethoxysilane; 2-mercaptomethyltolyl trimethoxysilane; 2-mercaptomethyltolyl triethoxysilane; 2-mercaptoethylphenyl trimethoxysilane; 2-mercaptoethylphenyl triethoxysilane; 2-mercaptoethyltolyl trimethoxysilane; 2-mercaptoethyltolyl triethoxysilane; 3-mercaptopropylphenyl trimethoxysilane; 3-mercaptopropylphenyl triethoxysilane; 3-mercaptopropyltolyl trimethoxysilane; and 3-mercaptopropyltolyl triethoxysilane.

The amino compound Formula V are commercially available. Representative examples include 4-aminobutyltriethoxysilane, (aminoethylaminomethyl)phenethyl-trimethoxysilane, N-(2-aminoethyl)-3-aminopropylmethyl-dimethoxysilane, N-(2-aminoethyl)-3-aminopropyltri-methoxysilane; N-(6-aminohexyl)aminopropyl-trimethoxysilane, 3-(m-aminophenoxy)propyltrimethoxy-silane, m-aminophenyltrimethoxysilane, p-aminophenyltrimethoxysilane, 3-(1-aminopropoxy)-3,3-dimethyl-1-propenyltrimethoxysilane, 3-aminopropyldiisopropylethoxy-silane, 3-aminopropyldimethylethoxysilane, 3-aminopropylmethyldiethoxysilane, 3-aminopropyltriethoxysilane, 3-aminopropyltrimethoxysilane, 3-aminopropyltris(methoxyethoxy-ethoxy)silane and 3-aminopropyltris(trimethylsiloxy)-silane.

The molar ratios of the mercaptan compound of Formula IV to the amino compound of Formula V may vary. Generally speaking, the molar ratio will range from 1.5:1 to 1:1.5 with a 1:1 ratio being preferred.

The siloxy containing salt compound of formula III when x is an integer of from 1 to 7 may be prepared by reacting the mercaptan of formula IV with an amino compound of formula V in the presence of sulfur, such as $S_8$ Rhombic sulfur may be used.

The molar ratio of the sulfur, $S_8$, compound to the mercaptan compound of formula IV or the amino compound of formula V may vary. Generally speaking, the molar ratio will range from 0.1:1 to 2:1, with a 1:1 ratio being preferred.

The above reaction is generally conducted in a non-glass reaction vessel.

Preferably, the reaction vessel is made of polyethylene and the reaction may be conducted neat or in the presence of a suitable solvent. If a solvent is used, the primary criterion is to use a solvent, which does not react with the starting materials or end product. Representative organic solvents include chloroform, dichloromethane, carbon tetrachloride, hexane, heptane, cyclohexane, xylene, benzene, toluene, aliphatic and cycloaliphatic alcohols. Preferably, water is avoided to prevent reaction with the siloxy groups of the compounds.

Additional silanes which may be used include unsymmetrical organosilicon compounds are of the formula Z-Alk-Y (VI)

where Alk and Z are as previously defined and Y will be a mercaptan compound of formula IV, an amino compound of formula V, —SCN (Thiocyanato silane), —NCO (Cyanato silane), —O—CHCH$_2$O (glycyloxy silane), —CHCH$_2$O (Epoxy silane), —OCO—C—(CH$_3$)=CH$_2$ (Metacrylato silane).

By varying the weight ratio of the silane to silica and the surface area of the resulting silica, one can control the resultant product. Generally speaking, the weight ratio of the silane to silica ranges from 2:1000 to 1:10. Preferably, the weight ratio ranges from 20:1000 to 50:1000.

The reaction between the silica surface and the silane compound of formula I is conducted in the presence of a phase transfer catalyst. Representative phase transfer catalysts may have a quaternary onium cation of the following structural formulae (VII), (VIII) or (IX):

(VII)

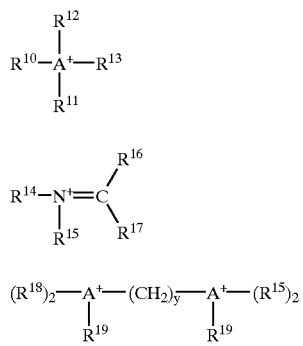

wherein A represents nitrogen, phosphorus or arsenic; $R^{10}$, $R^{11}$, $R^{12}$, and $R^{13}$, which may be the same or different, are each a linear or branched chain alkyl radical containing from 1 to 16 carbon atoms, optionally substituted with a phenyl, hydroxyl, halo, nitro, alkoxy or alkoxycarbonyl substituent; a linear or branched chain alkenyl radical containing from 2 to 12 carbon atoms, preferably from 4 to 8 carbon atoms and most preferably an alkenyl radical derived from the starting material conjugated diene; an aryl radical containing from 6 to 10 carbon atoms, optionally substituted by one or more alkyl substituents containing from 1 to 4 carbon atoms or alkoxy, alkoxycarbonyl or halo substituents; and with the proviso that any two of said radicals $R^{10}$ to $R^{13}$ may together form a single linear or branched chain alkylene, alkenylene or alkadienylene radical containing from 3 to 6 carbon atoms, $R^{14}$, $R^{15}$, $R^{16}$, and $R^{17}$, which also may be the same or different, are each a linear or branched chain alkyl radical containing from 1 to 4 carbon atoms; with the proviso that the $R^{16}$, and $R^{17}$ radicals may together form an alkylene radical containing from 3 to 6 carbon atoms; and with the further proviso that the $R^{15}$ and $R^{16}$ or $R^{15}$ and $R^{17}$ radicals may together form an alkylene, alkenylene or alkadienylene radical containing 4 carbon atoms and, together with the nitrogen atom, comprising a 5-membered nitrogen heterocycle; $R^{18}$ is a linear or branched chain alkyl radical containing from 1 to 4 carbon atoms, or a phenyl radical; $R^{19}$ is a linear or branched chain alkyl radical containing from 1 to 4 carbon atoms, and which may be the same or different from $R^{18}$, a linear or branched chain alkenyl radical containing from 2 to 12 carbon atoms, preferably from 4 to 8 carbon atoms, and more preferably an alkenyl radical derived from the starting material conjugated diene to be carbonylated; and y is an integer of from 1 to 10, and preferably less than or equal to 6.

Exemplary of the quaternary onium cations having the structural Formula VII, the following are representative: tetramethylammonium, triethylmethylammonium, tributylmethylammonium, trimethyl(n-propyl)ammonium, tetraethylammonium, tetrabutylammonium, dodecyltrimethylammonium, methyltrioctylammonium, heptyltributylammonium, tetrapropylammonium, tetrapentylammonium, tetrahexylammonium, tetraheptylammonium, tetraoctylammonium, tetradecylammonium, butyltripropylammonium, methyltributylammonium, pentyltributylammonium, methyldiethylpropylammonium, ethyldimethylpropylammonium, tetradodecylammonium, tetraoctadecylammonium, hexadecyltrimethylammonium, benzyltrimethylammonium, benzyldimethylpropylammonium, benzyldimethyloctylammonium, benzyltributylammonium, benzyltriethylammonium, phenyltrimethylammonium, benzyldimethyltetradecylammonium, benzyldimethylhexadecylammonium, dimethyldiphenylammonium, methyltrialkyl(C$_8$–C$_{10}$) ammonium, methyltriphenylammonium, buten-2-yltriethylammonium, N,N-dimethyl-tetramethyleneammonium, N,N-diethyl-tetramethyleneammonium, tetramethylphosphonium, tetrabutylphosphonium, ethyltrimethylphosphonium, trimethylpentylphosphonium, trimethylpentylphosphonium, octyltrimethylphosphonium, dodecyltrimethylphosphonium, trimethylphenylphosphonium, diethyldimethylphosphonium, dicyclohexyldimethylphosphonium, dimethyldiphenylphosphonium, cyclohexyltrimethylphosphonium, triethylmethylphosphonium, methyl-tri(isopropyl)phosphonium, methyl-tri(n-propyl)phosphonium, methyl-tri(n-butyl)phosphonium, methyl-tri(2-ethylpropyl)phosphonium, methyltricyclohexylphosphonium, methyltriphenylphosphonium, methyltribenzyl phosphonium, methyl-tri(4-methylphenyl)phosphonium, methyltrixylylphosphonium, diethylmethylphenylphosphonium, dibenzylmethylphenylphosphonium, ethyltriphenylphosphonium, tetraethylphosphonium, ethyltri(n-propyl)phosphonium, triethylpentylphosphonium, hexadecyltributylphosphonium, ethyltriphenylphosphonium, n-butyl-tri(n-propyl) phosphonium, butyltriphenylphosphonium, benzyltriphenylphosphonium, (β-phenylethyl) dimethylphenylphosphonium, tetraphenylphosphonium, triphenyl(4-methylphenyl)phosphonium, tetrakis (hydroxymethyl)phosphonium, tetrakis(2-hydroxyethyl) phosphonium and tetraphenylarsonium.

And exemplary of the Formula VIII cations are the following: N-methylpyridinium, N-ethylpyridinium, N-hexadecylpyridinium and N-methylpicolinium.

Among the cations having the structural Formula IX, the following are representative: 1,2-bis(trimethylammonium) ethane, 1,3-bis(trimethylammonium)propane, 1,4-bis (trimethylammonium)butane and 1,3 -bis (trimethylammonium)butane.

Representative of the anions of said onium salts include the following ions: $F^-$, $ClO_4^-$, $PF_6^-$, $BF_4^-$, tetraphenylborate anion, $PO_4^-$, $HPO_4^{-2}$, $H_2PO_4^-$; $CH_3SO_3^-$, $-SO_3^-HSO_4^-$, $NO_3^-$, $SO_4^{-2}$, $Cl^-$, and $Br^-$. Preferably, the anion is $Cl^-$ or $Br^-$.

A particularly preferred onium salt that is used is tetrabutyl ammonium bromide.

The amount of onium salt that is used in the process of the present invention may vary. Generally speaking, the amount of onium salt will range from about 0.1 to 10 mol percent, relative to the silane compound.

Wherein the phase transfer catalyst may be added to the reaction at any time, from a practical standpoint, the catalyst is preferably added to the reaction mixture all at once or portionwise at a temperature between 65° C. to 90° C. as a solid or concentrated (40 to 50 percent) aqueous solution.

The reaction between the silica and the silane of formula I is conducted in a two phase aqueous/organic system. The aqueous/organic system assists in the phase separation upon completion of the reaction. The silane compound of formula I is generally predissolved in the organic phase prior to addition to the reaction mixture containing the aqueous phase of silica particles. Representative examples of organic solvents include toluene, xylene, benzene, hexane, heptane, octane, decane, chlorobenzene and the like.

In accordance with the preferred embodiment of the present invention, the precipitated silica particulates are suspended or dispersed in the aqueous phase under continuous stirring. A solvent such as hexane is then added containing the silane compound of formula I. The mixture is then heated, optionally under an inert atmosphere. The mixture may be heated to a temperature ranging from about 60 to 100° C., with a temperature of from 75 to 95° C. being preferred. The appropriate amount of phase transfer catalyst is then added to the reaction mixture as a solid or as a concentrated aqueous solution with stirring. The progress of the reaction may then be followed by G.C. or other analytical techniques. Upon filtration, the desired product is separated. Depending on the degree of concentration of the silane or the silica, one will isolate the product in the aqueous or organic phase. At lower concentrations, the modified silica will be located in the aqueous phase. At higher concentrations, the modified silica will be located in the organic phase.

A liquid/liquid separator may be used to separate the two phases.

In the instance when the organic phase contains the modified silica, the product may be isolated or recovered by distilling the solvent or flash stripping the solvent.

If the modified silica is located in the aqueous phase, such separation typically comprises a filtration, if necessary, followed by washing. The filtration may be effected by any suitable techniques, for example via a filter press or band filter, or centrifuge or rotating filter under vacuum.

It is known that if one desires to subsequently spray dry the product, the proportion of dry solids in the suspension immediately before it is dried must be no greater than 24 percent, but greater than 13 percent, by weight.

The suspension of silane treated silica thus recovered (filter cake) is then dried.

The drying step may be effected by any of the conventional techniques known to those skilled in the art. The preferred technique is spray drying. Any appropriate type of spray may be used for this purpose, especially turbine, nozzle, liquid pressure diffuses or dual fluid sprays.

The silica modified precipitated silica is in the form of substantially spherical beads, preferably having an average particle size of at least 80 microns and with a mean particle size of from 5 to 70 microns.

The dried silane modified silica of low concentration may be subjected to an agglomeration stage. The term "agglomeration" is intended to include any technique for bonding divided materials to convert them into larger, mechanically strong particles. Such techniques typically include dry compacting, direct compression, wet granulation (i.e. using a binder such as water, silica slurry or the like) and extrusion. The apparatus used to carry out such techniques is well known to this art and includes, for example, compacting presses, pelleting machines, rotating drum compacting machines, rotating granulators and extruders. The dry compacting technique is preferred, and in particular, a drum-type compacting machine where the compacting is effected by conveying powdered product between two rolls which are under pressure and rotating in reverse directions. The pressure exerted may range from 15 to 50 bars. When this technique is used, it is advantageous to deaerate the powdered products prior to the compacting stage, such as to remove the air included therein. (This operation is also described as predensification or degassing.) The deaeration may be carried out in apparatus which is per se well known to the art, by transferring the powders between porous elements (plates or drums) equipped with a vacuum suction system.

The dried silane modified silica of high concentration (found in organic phase) may be agglomerated in a different manner. In this case, an oil, polymer or wax may be added and then an extruder or granulation may be used to compact the product. In accordance with another embodiment, a polymer cement may be used at this stage to form a silica-polymer masterbatch.

Upon completion of the agglomeration stage, the silane treated silica may be calibrated to a desired predetermined size, for example, by screening, and then packaged for use.

The weight percent of the silane on the silica may vary. For example, the amount of silane on the silica may range from 0.2 percent by weight to 10 percent by weight of the total weight of the modified silica. Preferably, the level ranges from 2 percent to 5 percent by weight.

The level of surface modified silica which may be added to the rubber may range from 1 to 200 parts by weight per 100 parts by weight of rubber (phr). Preferably, the level of surface modified silica may range from 10 to 110 phr.

In order to be incorporated into a rubber compound of a tire, the surface modified silica are mixed with rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include a carboxylated rubber, silicon-coupled and tin-coupled star-branched polymers. The preferred rubber or elastomers are polybutadiene and SBR.

In one aspect the rubber to be combined with the surface modified silica is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 weight percent bound styrene or, for some applications, an E-SBR having a medium to relatively high bound styrene content, namely, a bound styrene content of about 30 to about 45 weight percent.

When used in the tire tread, the relatively high styrene content of about 30 to about 45 weight percent bound styrene for the E-SBR can be considered beneficial for a purpose of enhancing traction, or skid resistance. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 weight percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer."

In addition to the silane modified silica and elastomer, conventional fillers may be also present. The amount of such conventional fillers may range from 10 to 250 phr. Preferably, the filler is present in an amount ranging from 20 to 100 phr.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP No. ranging from 34 to 150 $cm^3/100$ g.

It may be preferred to have the rubber composition to additionally contain a separately added conventional sulfur containing organosilicon compound. Examples of suitable sulfur containing organosilicon compounds are of formulas I and II above.

The amount of the separately added sulfur containing organosilicon compound of formulas I and II in a rubber composition will vary depending on the level of other additives that are used, including the level of modification of the silane treated silica. Generally speaking, the amount of the compound of formulas I and II will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber and surface modified silica are mixed in one or more non-productive mix stages. The terms "non-productive" and "productive" mix stages are well known to those having skill in the rubber mixing art. The silane modified silica may be added as a separate ingredient or in the form of a masterbatch. The rubber composition containing the surface modified silica may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The rubber composition containing the rubber and surface modified silica may be incorporated in a variety of rubber components of the tire. For example, the rubber component may be a tread (including tread cap and tread base), sidewall, apex, chafer, sidewall insert, wirecoat and plycoat. Preferably, the compound is tread.

The pneumatic tire of the present invention may be a passenger tire, aircraft tire, agricultural, earthmover, off-the-road, truck tire and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air.

Upon vulcanization of the sulfur vulcanized composition, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in a sidewall and/or the tread of a tire. As can be appreciated, the tire may be a passenger tire, aircraft tire, race, truck tire and the like. Preferably, the tire is a passenger tire. The tire may also be a radial or bias, with a radial tire being preferred.

This invention is illustrated by the following working example which is presented merely for the purpose of illustration and is not intended to be limiting the scope of the invention. Unless specifically indicated otherwise, parts and percentages are given by weight.

While certain representative embodiment and details have been shown for the purpose of illustrating the invention, it will be apparent to those skilled in the art that various changes and modifications may be made therein without departing from the spirit or scope of the invention.

What is claimed is:

1. A process for the modification of the surface of a silica with a silane compound comprising mixing an aqueous suspension of precipitated silica particulates with a silane compound which is dissolved in an organic solvent, in the presence of a phase transfer catalyst.

2. The process of claim 1 wherein prior to said mixing step, the precipitated silica particulates are prepared by (1) reacting a silicate with an acid agent by
    (a) introducing the acid agent into an aqueous reaction medium containing at least a portion of the silicate and an electrolyte,
    (b) adjusting the pH of the reaction medium to a value of at least 7; and
    (c) introducing additional acid agent and any remaining required silicate into said reaction medium.

3. The process of claim 1 wherein said silane compound is of the formula:

in which Z is selected from the group consisting of

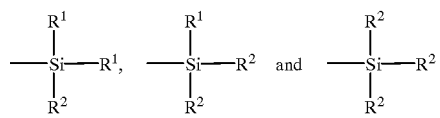

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent radical selected from the group consisting of aliphatic hydrocarbons and aliphatic-aromatic hydrocarbons having 1 to 18 carbon atoms and n is an integer of 2 to 8.

4. The process of claim 3 wherein said silane compound is selected from the group consisting of 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di-t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec.butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide and 3,3'-bis(dimethoxyphenylsilyl-2-methylpropyl) disulfide.

5. The process of claim 1 wherein said silane compound is of the formula:

in which Z is selected from the group consisting of

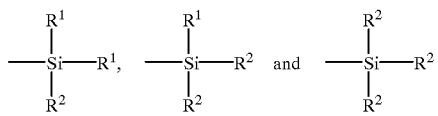

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent radical selected from the group consisting of aliphatic hydrocarbons and aliphatic-aromatic hydrocarbons having 1 to 18 carbon atoms and n is an integer of 2 to 8.

6. The process of claim 5, wherein said silane compound is selected from the group consisting of 3-(trimethoxysilylpropyl) n-alkyl disulfide, 3-(triethoxysilylpropyl) n-alkyl tetrasulfide, 3-(triethoxysilylpropyl) n-alkyl octasulfide, 3-(trimethoxysilylpropyl) n-alkyl tetrasulfide, 2-(triethoxysilylethyl) n-alkyl tetrasulfide, 3-(trimethoxysilylpropyl) n-alkyl trisulfide, 3-(triethoxysilylpropyl) n-alkyl trisulfide, 3-(tributoxysilylpropyl) n-alkyl disulfide, 3-(trimethoxysilylpropyl) n-alkyl hexasulfide, 3-(trimethoxysilylpropyl) n-alkyl octasulfide, 3-(trioctoxysilylpropyl) n-alkyl tetrasulfide, 3-(trihexoxysilylpropyl) n-alkyl disulfide, 3-(triisooctoxysilylpropyl) n-alkyl tetrasulfide, 3-(tri-t-butoxysilylpropyl) n-alkyl disulfide, 2-(methoxy diethoxy silyl ethyl) n-alkyl tetrasulfide, 2-(tripropoxysilylethyl) n-alkyl pentasulfide, 3-(tricyclonexoxysilylpropyl) n-alkyl tetrasulfide, 3-(tricyclopentoxysilylpropyl) n-alkyl trisulfide, 2-(dimethyl methoxysilylethyl) n-alkyl disulfide, 2-(dimethyl sec.butoxysilylethyl) n-alkyl trisulfide, 3-(methyl butylethoxysilylpropyl) n-alkyl tetrasulfide, 3-(di t-butylmethoxysilylpropyl) n-alkyl tetrasulfide, 2-(phenyl methyl methoxysilylethyl) n-alkyl trisulfide, 3-(diphenyl isopropoxysilylpropyl) n-alkyl tetrasulfide, 3-(diphenyl cyclohexoxysilylpropyl) n-alkyl disulfide, 3-(dimethyl ethylmercaptosilylpropyl) n-alkyl tetrasulfide, 2-(methyl dimethoxysilylethyl) n-alkyl trisulfide, 2-(methyl ethoxypropoxysilylethyl) n-alkyl tetrasulfide, 3-(diethyl methoxysilylpropyl) n-alkyl tetrasulfide, 3-(ethyl di-sec. butoxysilylpropyl) n-alkyl disulfide, 3-(propyl diethoxysilylpropyl) n-alkyl disulfide, 3-(butyl dimethoxysilylpropyl) n-alkyl trisulfide, 3-(phenyl dimethoxysilylpropyl) n-alkyl tetrasulfide, 4-(trimethoxysilylbutyl) n-alkyl tetrasulfide, 6-(triethoxysilylhexyl) n-alkyl tetrasulfide, 12-(triisopropoxysilyl dodecyl) n-alkyl disulfide, 18-(trimethoxysilyloctadecyl) n-alkyl tetrasulfide, 18-(tripropoxysilyloctadecenyl) n-alkyl tetrasulfide, 4-(trimethoxysilyl-buten-2-yl) n-alkyl tetrasulfide, 4-(trimethoxysilylcyclohexylene) n-alkyl tetrasulfide, 5-(dimethoxymethylsilylpentyl) n-alkyl trisulfide, 3-(trimethoxysilyl-2-methylpropyl) n-alkyl tetrasulfide and 3-(dimethoxyphenylsilyl-2-methylpropyl) n-alkyl disulfide.

7. The process of claim 1 wherein said silane is of the formula

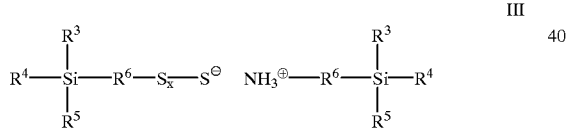

III wherein each $R^3$ and $R^4$ are independently selected from the group consisting of alkoxy radicals having from 1 to 8 carbon atoms and alkyls having from 1 to 8 carbon atoms; $R^5$ is selected from the group consisting of alkoxy radicals having from 1 to 8 carbon atoms; each $R^6$ is independently selected from the group consisting of alkylenes and having from 1 to 15 carbon atoms, arylenes alkyl substituted arylenes having from 6 to 10 carbon atoms, —$R^7$—O—$R^8$— and —$R^7$—NH—$R^9$—; $R^7$ and $R^9$ are independently selected from the group consisting of alkylenes having from 1 to 15 carbon atoms, arylenes and alkyl substituted arylenes having from 6 to 10 carbon atoms; $R^8$ is selected from the group consisting of alkylenes having from 1 to 15 carbon atoms, arylenes and alkyl substituted arylenes having from 6 to 10 carbon atoms and alkenylenes having from 2 to 15 carbon atoms; and x is an integer of from 0 to 7.

8. The compound of claim 1 wherein each $R^3$, $R^4$ and $R^5$ is an alkoxy radical having 1 to 3 carbon atoms, each $R^6$ is an alkylene group having 1 to 3 carbon atoms; and x is 0.

9. The process of claim 1 wherein said silane is of the formula

Z-Alk-Y in which Z is selected from the group consisting of

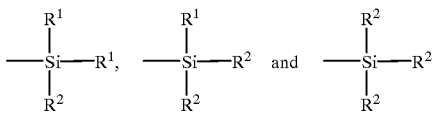

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent radical selected from the group consisting of aliphatic hydrocarbons and aliphatic-aromatic hydrocarbons having 1 to 18 carbon atoms and Y is selected from the group consisting of

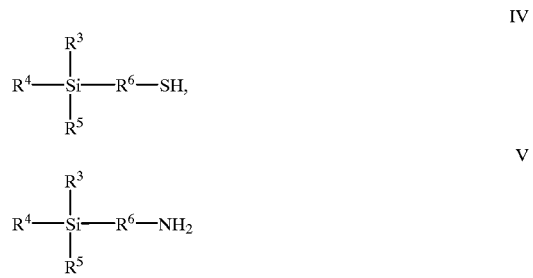

IV

V

—SCN, —NCO, —O—CH CH$_2$O, —CHCH$_2$O, —OCO—C—(CH$_3$)=CH$_2$, wherein each $R^3$ and $R^4$ are independently selected from the group consisting of alkoxy radicals having from 1 to 8 carbon atoms and alkyls having from 1 to 8 carbon atoms; $R^5$ is selected from the group consisting of alkoxy radicals having from 1 to 8 carbon atoms; each $R^6$ is independently selected from the group consisting of alkylenes and having from 1 to 15 carbon atoms, arylenes alkyl substituted arylenes having from 6 to 10 carbon atoms, —$R^7$—O—$R^8$— and —$R^7$—NH$^9$—, $R^7$ and $R^9$ are independently selected from the group consisting of alkylenes having from 1 to 15 carbon atoms, arylenes and alkyl substituted arylenes having from 6 to 10 carbon atoms; $R^8$ si selected from the group consisting of alkylenes having from 1 to 15 carbon atoms, arylenes and alkyl substituted arylenes having from 6 to 10 carbon atoms and alkenylenes having from 2 to 15 carbon atoms; and x is an integer of from 0 to 7.

10. The process of claim 1 wherein the phase transfer catalyst is selected from formulae:

(VII)

(VIII)

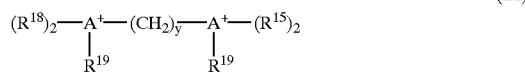

(IX)

wherein A represents nitrogen, phosphorus or arsenic; $R^{10}$, $R^{11}$, $R^{12}$, $R^{13}$, which may be the same or different, are each a linear or branched chain alkyl radical containing from 1 to 16 carbon atoms, optionally substituted with a phenyl, hydroxyl, halo, nitro, alkoxy or alkoxycarbonyl substituent; a linear or branched chain alkenyl radical containing from 2 to 12 carbon atoms; an aryl radical containing from 6 to 10 carbon atoms, optionally substituted by one or more alkyl substituents containing from 1 to 4 carbon atoms or alkoxy, alkoxycarbonyl or halo substituents; and with the proviso that any two of said radicals $R^{10}$ to $R^{13}$ may together form a single linear or branched chain alkylene, alkenylene or alkadienylene radical containing from 3 to 6 carbon atoms, $R^{14}$, $R^{15}$, $R^{16}$, $R^{17}$, which also may be the same or different, are each a linear or branched chain alkyl radical containing from 1 to 4 carbon atoms; with the proviso that the $R^{16}$, and $R^{17}$ radicals may together form an alkylene radical containing from 3 to 6 carbon atoms; and with the further proviso that the $R^{15}$ and $R^{16}$ or $R^{15}$ and $R^{17}$ radicals may together form an alkylene, alkenylene or alkadienylene radical containing 4 carbon atoms and, together with the nitrogen atom, comprising a 5-membered nitrogen heterocycle; $R^{18}$ is a linear or branched chain alkyl radical containing from 1 to 4 carbon atoms, or a phenyl radical; $R^{19}$ is a linear or branched chain alkyl radical containing from 1 to 4 carbon atoms, and which may be the same or different from $R^{18}$, a linear or branched chain alkenyl radical containing from 2 to 12 carbon atoms; and y is an integer greater than or equal to 1 and less than or equal to 10.

11. The process of claim 10 wherein said phase transfer catalyst is selected from the group of cations consisting of tetramethylammonium, triethylmethylammonium, tributylmethylammonium, trimethyl(n-propyl)ammonium, tetraethylammonium, tetrabutylammonium, dodecyltrimethylammonium, methyltrioctylammonium, heptyltributylammonium, tetrapropylammonium, tetrapentylammonium, tetrahexylammonium, tetraheptylammonium, tetraoctylammonium, tetradecylammonium, butyltripropylammonium, methyltributylammonium, pentyltributylammonium, methyldiethylpropylammonium, ethyldimethylpropylammonium, tetradodecylammonium, tetraoctadecylammonium, hexadecyltrimethylammonium, benzyltrimethylammonium, benzyldimethylpropylammonium, benzyldimethyloctylammonium, benzyltributylammonium, benzyltriethylammonium, phenyltrimethylammonium, benzyldimethyltetradecylammonium, benzyldimethylhexadecylammonium, dimethyldiphenylammonium, methyltrialkyl(C8–C10) ammonium, methyltriphenylammonium, buten-2-yltriethylammonium, N,N-dimethyl-tetramethyleneammonium, N,N-diethyl-tetramethyleneammonium, tetramethylphosphonium, tetrabutylphosphonium, ethyltrimethylphosphonium, trimethylpentylphosphonium, trimethylpentylphosphonium, octyltrimethylphosphonium, dodecyltrimethylphosphonium, trimethylphenylphosphonium, diethyldimethylphosphonium, dicyclohexyldimethylphosphonium, dimethyldiphenylphosphonium, cyclohexyltrimethylphosphonium, triethylmethylphosphonium, methyl-tri(isopropyl) phosphonium, methyl-tri(n-propyl)phosphonium, methyl-tri (n-butyl)phosphonium, methyl-tri(2-methylpropyl) phosphonium, methyltricyclohexylphosphonium, methyltriphenylphosphonium, methyltribenzyl phosphonium, methyl-tri(4-methylphenyl)phosphonium, methyltrixylylphosphonium, diethylmethylphenylphosphonium, dibenzylmethylphenylphosphonium, ethyltriphenylphosphonium, tetraethylphosphonium, ethyl-tri(n-propyl)phosphonium, triethylpentylphosphonium, hexadecyltributylphosphonium, ethyltriphenylphosphonium, n-butyl-tri(n-propyl) phosphonium, butyltriphenylphosphonium, benzyltriphenylphosphonium, (β-phenylethyl) dimethylphenylphosphonium, tetraphenylphosphonium, triphenyl(4-methylphenyl)phosphonium, tetrakis (hydroxymethyl)phosphonium, tetrakis(2-hydroxyethyl) phosphonium, tetraphenylarsonium, N-methylpyridinium, N-ethylpyridinium, N-hexadecylpyridinium, N-methylpicolinium, 1,3-bis-2-yldimethylammonium) propane, 1,2-bis(trimethylammonium)ethane, 1,3-bis (trimethylammonium)propane, 1,4-bis (trimethylammonium)butane, and 1,3-bis (trimethylammonium)butane and selected from the group of anions consisting of $F^-$, $ClO_4^-$, $PF_6^-$, $BF_4^-$, tetraphenylborate anion, $PO_4^{-3}$, $HPO_4^{-2}$, $H_2PO_4^-$, $CH_3SO_3^-$,

—$SO_3^-$ $HSO_4^-$, $NO_3^-$, $SO_4^{-2}$, $Cl^-$, and $Br^-$.

12. The process of claim 1 wherein said phase transfer catalyst is tetrabutyl ammonium bromide.

13. The process of claim 1 wherein said phase transfer catalyst is an onium salt that is present in an amount ranging from 0.1 to 10 mol percent relative to the silane compound.

14. The process of claim 1 wherein the organic solvent is selected from the group consisting of toluene, xylene, benzene, hexane, heptane, octane, decane, chlorobenzene and mixtures thereof.

15. The process of claim 13 wherein said organic solvent is hexane.

16. The process of claim 1 wherein following the mixing step, the organic phase is separated from the aqueous phase.

17. The process of claim 16 wherein the precipitated silica particulates are recovered from the aqueous phase and dried.

18. The process of claim 17 wherein the precipitated silica particulates are spray dried.

19. The process of claim 17 further comprising comminuting the dried precipitated silica particulates.

20. A silica which has its surface modified by the process of claim 1.

* * * * *